US012741569B2

(12) United States Patent
Usui et al.

(10) Patent No.: US 12,741,569 B2
(45) Date of Patent: Sep. 22, 2026

(54) SEAT DEVICE FOR VEHICLE AND CONTROL METHOD THEREOF

(71) Applicant: Honda Motor Co., Ltd., Tokyo (JP)

(72) Inventors: Shogo Usui, Tokyo (JP); Koji Hashimoto, Tokyo (JP); Masakazu Okada, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 3 days.

(21) Appl. No.: 18/942,746

(22) Filed: Nov. 10, 2024

(65) Prior Publication Data

US 2025/0236214 A1 Jul. 24, 2025

(30) Foreign Application Priority Data

Jan. 24, 2024 (CN) ......................... 202410098032.3

(51) Int. Cl.
*B60N 2/02* (2006.01)

(52) U.S. Cl.
CPC ....... *B60N 2/0244* (2013.01); *B60N 2/02246* (2023.08)

(58) Field of Classification Search
CPC . B60N 2/0244; B60N 2/02246; B60N 2/0276
See application file for complete search history.

(56) References Cited

U.S. PATENT DOCUMENTS

2019/0152346 A1* 5/2019 Kim ......................... B60Q 9/00
2022/0282543 A1* 9/2022 Elsarelli .................. B60R 11/00
2022/0290480 A1* 9/2022 Machii ............... B60N 2/02246
2023/0219464 A1* 7/2023 Imai ................... B60N 2/02246 701/49
2023/0234477 A1* 7/2023 Ozawa ................ B60N 2/0248 701/49

FOREIGN PATENT DOCUMENTS

JP 2008195256 8/2008
JP 2011042300 3/2011

* cited by examiner

*Primary Examiner* — Harry Y Oh
*Assistant Examiner* — Danielle M Jackson
(74) *Attorney, Agent, or Firm* — JCIPRNET

(57) ABSTRACT

Provided are a seat device for a vehicle and a control method thereof. The seat device for the vehicle includes: an electric device for moving a seat of the vehicle; a pinch detection unit that detects a pinched obstacle by detecting a load change of the electric device when the seat moves; an obstacle detection unit that detects whether the obstacle exists in a moving direction of the seat; and a control unit that reduces a pinch load on the obstacle caused by the seat when the obstacle exists.

12 Claims, 9 Drawing Sheets

SEAT DEVICE FOR VEHICLE AND CONTROL METHOD THEREOF

CROSS-REFERENCE TO RELATED APPLICATION

This application claims the priority benefit of China application serial no. 202410098032.3, filed on Jan. 24, 2024. The entirety of the above-mentioned patent application is hereby incorporated by reference herein and made a part of this specification.

BACKGROUND

Technical Field

The disclosure relates to a seat device for a vehicle and a control method thereof.

Description of Related Art

In recent years, efforts have been actively made to provide access to sustainable transportation systems that also take into account disadvantaged groups of transport participants, such as the elderly, the disabled or children. In order to achieve the stated purpose, research and development efforts are made to further improve the safety and convenience of transportation through development related to the livability of vehicle.

Just like the power windows and sunroof of the vehicle may perform pinch detection, the seats also use motor pulse sensors to detect their position. When detecting the squeeze caused by the movement of a seat (i.e., the front seat moves and pinches the rear seat occupant), since the surface of the seat is soft and has different characteristics from rigid objects such as power windows and sunroofs, when the pinch caused by the seat is detected, the load will be dissipated, causing the frequency change of the motor rotation to tend to become smaller, which leads to the problem of increased pinch load and is an issue that needs to be resolved.

By changing a determination threshold for differential (difference) determination from the motor frequency to increase sensitivity, the detection load may be reduced. However, during normal operation, false detection may easily occur.

However, in terms of the livability of the vehicle, a problem remains as to how to reduce false detection when the seat is pinched by automatic operation.

SUMMARY

The disclosure aims to reduce false detection when a seat is pinched by automatic operation, which in turn, helps develop sustainable transportation systems.

Based on the above description, according to an embodiment of the disclosure, a seat device for a vehicle is provided. The seat device for the vehicle includes: an electric device for moving a seat of the vehicle; a pinch detection unit that detects a pinched obstacle by detecting a load change of the electric device when the seat moves; an obstacle detection unit that detects whether the obstacle exists in a moving direction of the seat; and a control unit that reduces a pinch load on the obstacle caused by the seat when the obstacle exists.

According to another embodiment of the disclosure, a control method for a seat device for a vehicle is provided.

The seat device has an electric device for moving a seat of the vehicle. The control method comprises: detecting a pinched obstacle by detecting a load change of the electric device when the seat moves; detecting whether the obstacle exists in a moving direction of the seat; and reducing a pinch load on the obstacle caused by the seat when the obstacle exists.

According to the embodiment of the disclosure, when the obstacle detection unit disposed in the vehicle detects the possibility of pinch, the determination threshold of pinch detection is changed to improve the sensitivity and reduce the pinch load. Also, by reducing the motor speed and lowering the pinch load without changing the determination threshold of pinch detection, false detection during normal operation may be prevented, and the pinch load may also be lowered only when a pinch condition occurs.

DESCRIPTION OF THE EMBODIMENTS

Figure 1A:
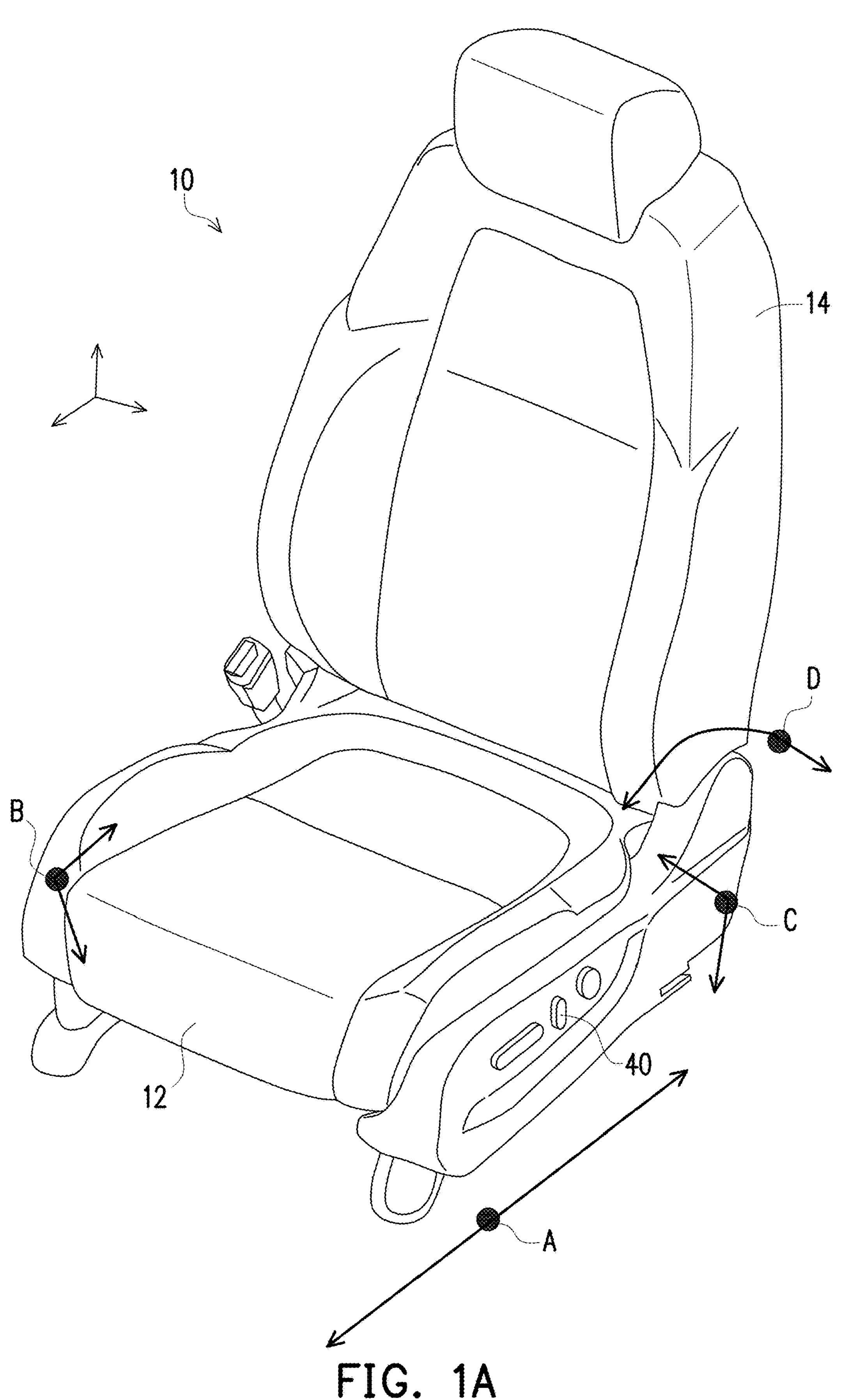
FIG. 1A and FIG. 1B are schematic structural diagrams of a seat of a vehicle.

According to an embodiment of the disclosure, in the seat device for the vehicle, the pinch detection unit is configured to determine that the obstacle is pinched when the load change of the electric device exceeds a predetermined determination threshold. Furthermore, the control unit reduces the predetermined determination threshold of the pinch detection unit when the obstacle exists compared to when the obstacle does not exist.

According to an embodiment of the disclosure, in the seat device for the vehicle, when the obstacle detection unit detects that the obstacle exists, the control unit reduces a moving speed of the seat compared to when the obstacle does not exist.

According to an embodiment of the disclosure, in the seat device for the vehicle, the seat of the vehicle further includes a seat cushion portion and a seat back portion.

According to an embodiment of the disclosure, in the control method for the seat device for the vehicle, the control method further includes: determining that the obstacle is pinched when the load change of the electric device exceeds a predetermined determination threshold. The predetermined determination threshold of the pinch detection unit is reduced when the obstacle exists compared to when the obstacle does not exist.

According to an embodiment of the disclosure, in the control method for the seat device for the vehicle, when it is detected that the obstacle exists, a moving speed of the seat is reduced compared to when the obstacle does not exist.

According to an embodiment of the disclosure, in the control method for the seat device for the vehicle, the seat of the vehicle further includes a seat cushion portion and a seat back portion.

Reference will now be made in detail to the present preferred embodiments of the disclosure, examples of which are illustrated in the accompanying drawings. Whenever possible, the same reference numbers are used in the drawings and description to refer to the same or like parts.

Figure 1B:
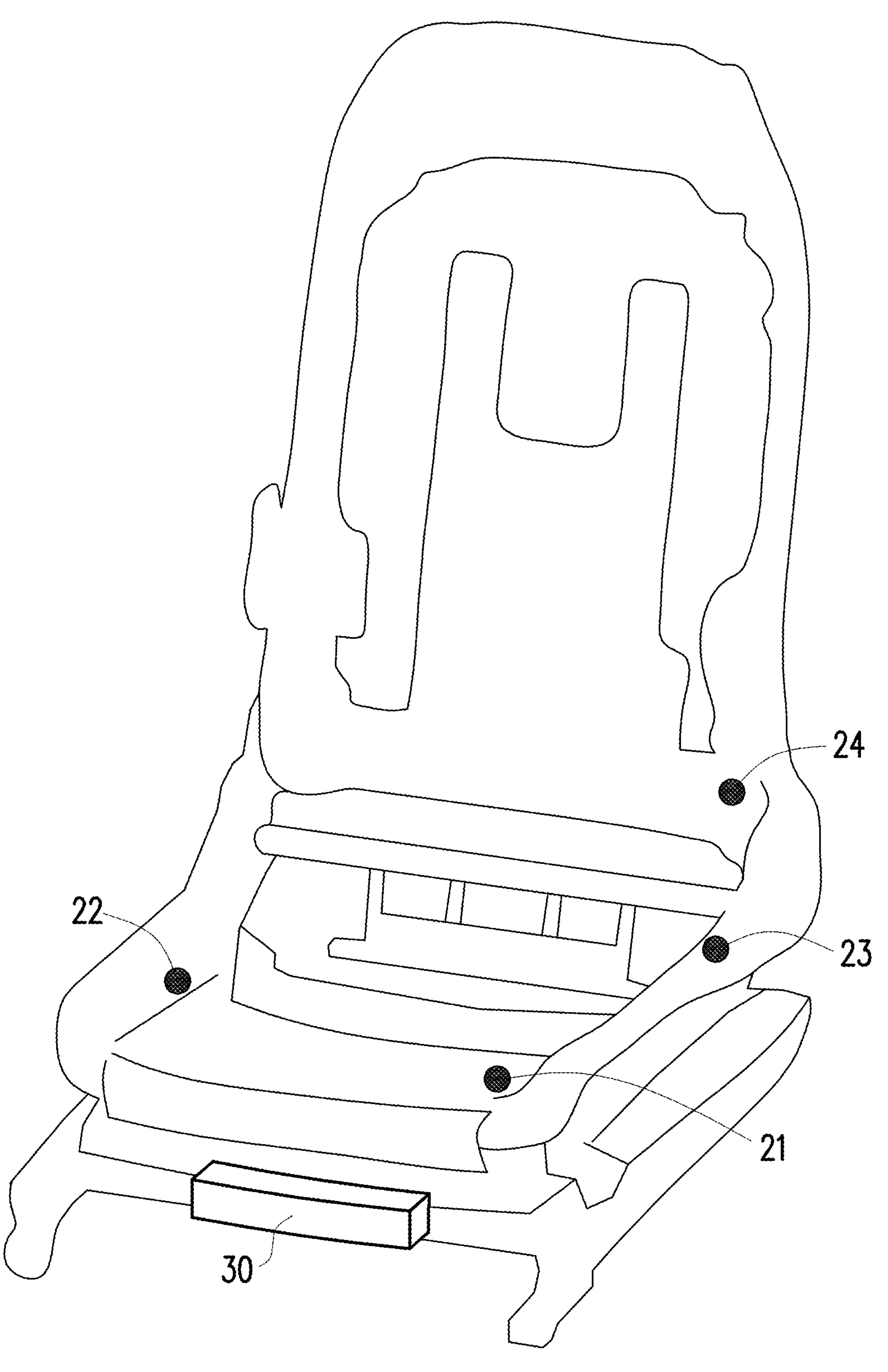

FIG. 1A and FIG. 1B are schematic structural diagrams of a seat of a vehicle. As shown in FIG. 1A and FIG. 1B, as an example, a seat 10 of the vehicle may include a seat cushion portion 12 and a seat back portion 14. Furthermore, the seat cushion portion 12 and the seat back portion 14 may be pivotally connected together. Generally speaking, the seat 10 is disposed in the interior of the vehicle. The seats disposed at the front of the vehicle may include at least a driver seat and a passenger seat. Generally speaking, the seat of the vehicle may provide movement or rotation in at least four directions, such as forward and backward movement of the entire seat 10, up and down movement of the entire seat 10, tilt movement of the front end of the seat cushion portion 12, and forward and backward tilt movement of the seat back portion 14. Of course, in higher-end seats 10, more directions of movement may be provided.

As shown in FIG. 1A and FIG. 1B, the seat 10 is slidably mounted on the floor of the interior of the vehicle, whereby the seat 10 may move forward and backward along a direction A (substantially in line with the front-rear direction of the vehicle) by a motor 21. The seat 10 may move (tilt) the front end of the seat cushion portion 12 up and down in a direction B by a motor 22. The seat 10 may move up and down in a direction C (i.e., the height direction) by a motor 23, whereby the height of the seat 10 may be adjusted. Thus, the seat back portion 14 may be rotated in a direction D by a motor 24, that is, the seat back portion 14 may fall backward or forward.

As an embodiment, the seat 10 may also be disposed with a controller 30, such as a seat control electric control unit (ECU). The controller 30 is composed of, for example, a processor, which may receive user instructions (for example, the user may operate a switch group 40 disposed on the seat 10) to control at least one of the motors 21 to 24 to adjust the posture of the seat 10. The controller 30 as the seat control ECU is also used to execute the control programs described later. In addition, these control programs may also be controlled by the vehicle's core ECU. The core ECU may receive detection signals from various sensors disposed in a vehicle V, and perform corresponding control programs through calculations.

Figure 2:
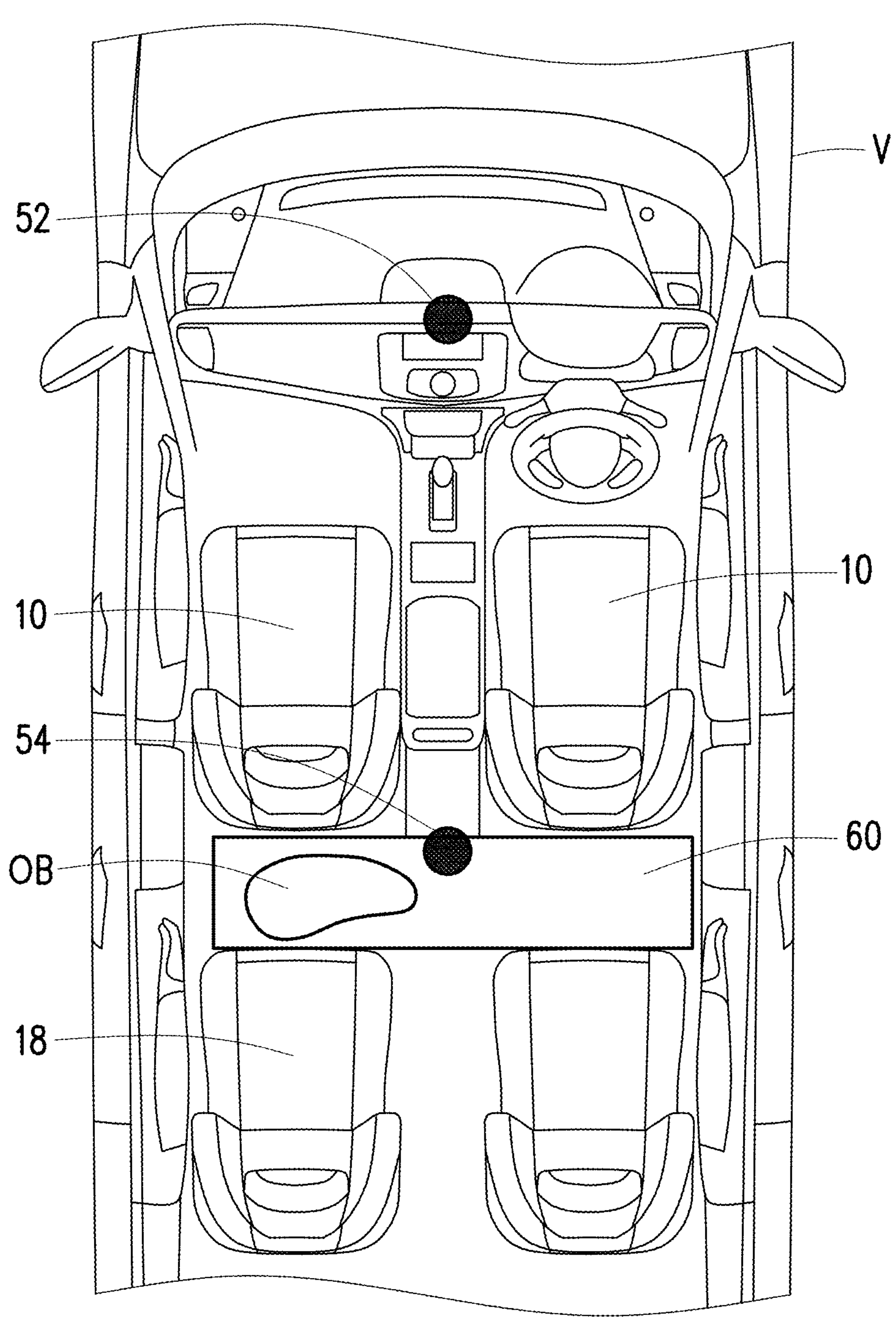
FIG. 2 is a schematic structural diagram of detecting an obstacle inside a vehicle.

FIG. 2 is a schematic structural diagram of detecting an obstacle inside a vehicle. As shown in FIG. 2, detection devices 52 and 54 for detecting an obstacle OB are disposed in the interior of the vehicle V. These detection devices 52 and 54 may be, for example, cameras or radars. As an example, a camera or a radar, etc. may be disposed in the roof pad of the vehicle V, and of course may also be disposed in other suitable places in the interior of the vehicle V. As an example of an embodiment of the disclosure, the cameras or radars 52 and 54 may detect within a detection area 60 between the front seat 10 and a rear seat 18 to determine whether the obstacle OB exists within the detection area 60.

Figures 3A, 3B:
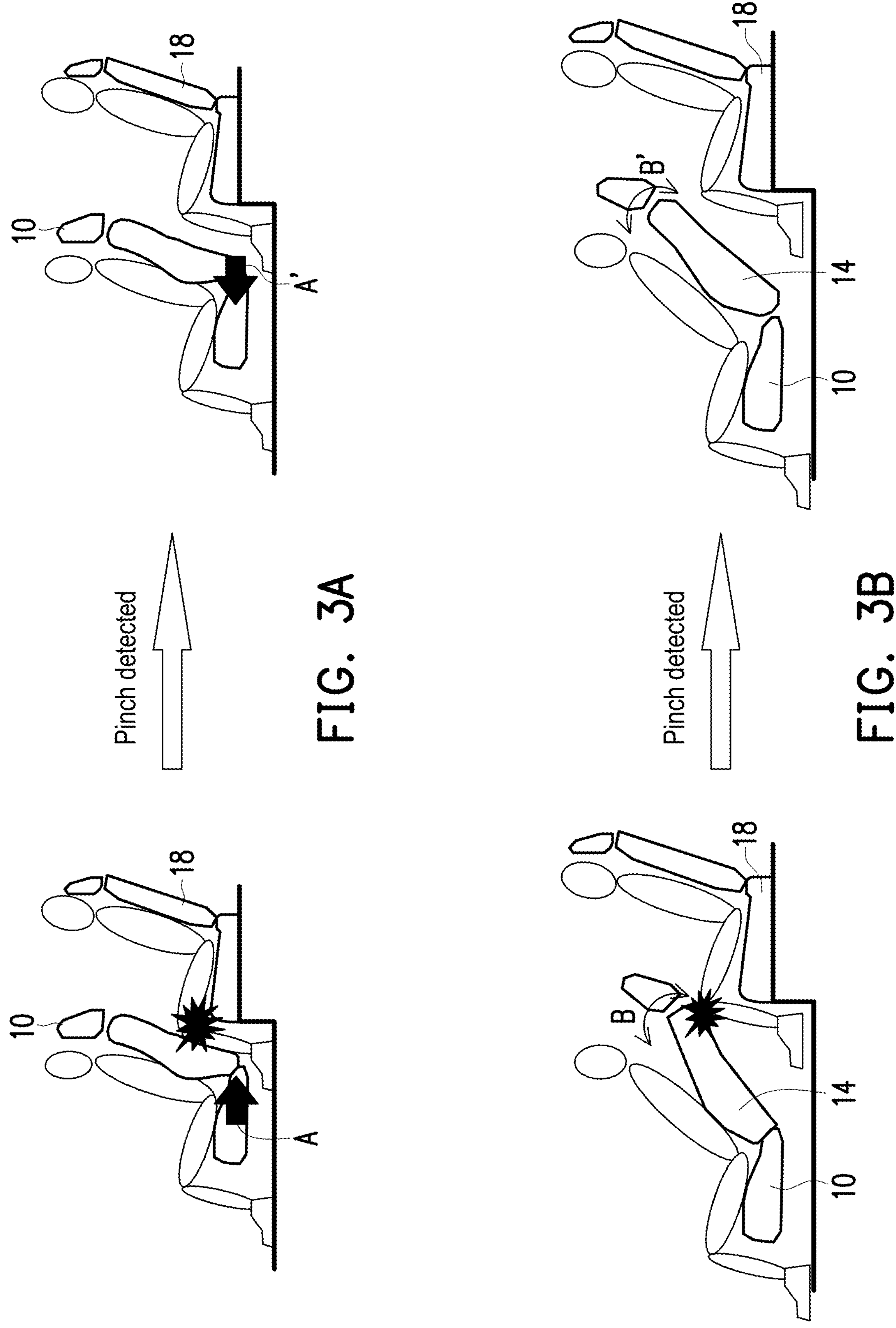
FIG. 3A and FIG. 3B show a pinch condition caused by a seat movement.

FIG. 3A and FIG. 3B show a pinch condition caused by a seat movement. As shown in FIG. 3A, when the front driver or passenger adjusts the seat 10 to move backward along the direction A, the seat 10 may pinch the occupant of the rear seat 18. At this time, the controller 30 serving as the seat control ECU may control the motor 21 of the seat 10 (see FIG. 1B) to move the seat 10 forward a predetermined distance along a direction A' opposite to the direction A, so as to relieve the seat 10 from pinching the occupant of the rear seat 18. Likewise, as shown in FIG. 3B, when the front driver or passenger adjusts the seat 10 along the direction D so that the seat back portion 14 falls backward, the seat 10 may pinch the occupant of the rear seat 18. At this time, the controller 30 serving as the seat control ECU may control the motor 24 of the seat 10 (see FIG. 1B) to make the seat back portion 14 of the seat 10 fall forward a predetermined distance along a direction D' opposite to the direction D, so as to relieve the seat 10 from pinching the occupant of the rear seat 18.

According to the embodiment of the disclosure, the disclosure further provides a control method for the seat 10 when an obstacle exists between the front seat 10 and the rear seat 18, so as to avoid the obstacle OB and the rear occupant from being pinched. This control method is further described below.

Figure 4:
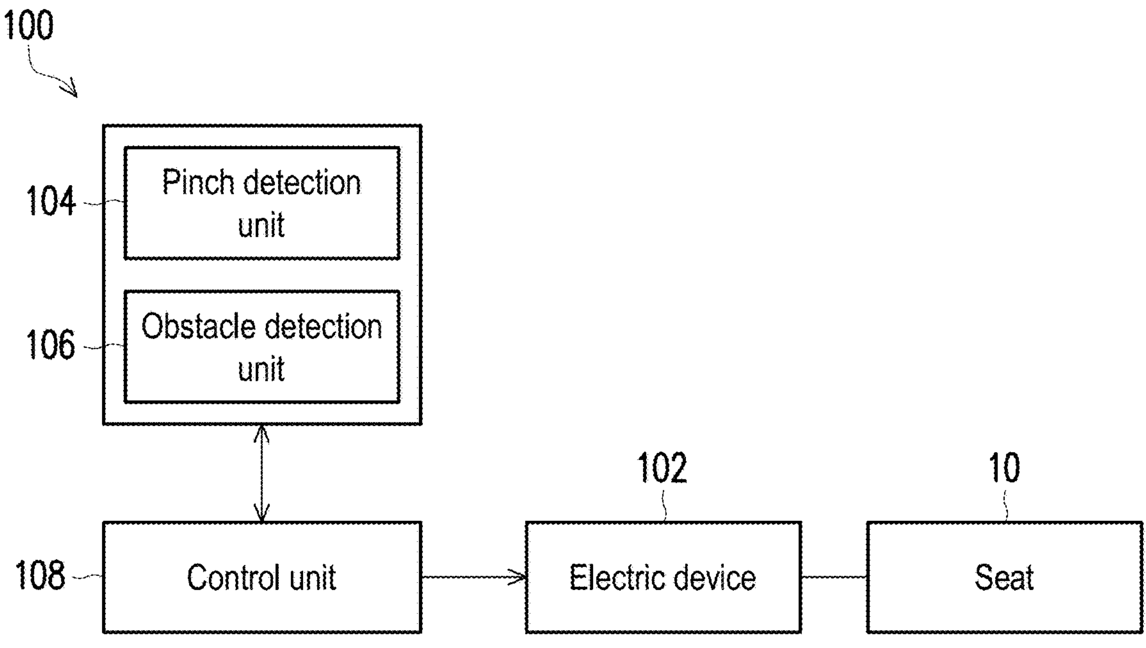
FIG. 4 is a schematic structural diagram of a seat device for a vehicle according to an embodiment of the disclosure.

FIG. 4 is a schematic block diagram of a seat device for a vehicle according to an embodiment of the disclosure. As shown in FIG. 1A and FIG. 1B to FIG. 4, a seat device 100 may include an electric device 102, a pinch detection unit 104, an obstacle detection unit 106, and a control unit 108. The electric device 102 is configured to move the seat 10 of the vehicle V, that is, to control the movement of the seat 10 in the directions A to D shown in FIG. 1A. The electric device 102 may be composed of the motors 21 to 24 shown in FIG. 1B.

Furthermore, the pinch detection unit 104 is configured to detect whether the obstacle OB is pinched by detecting a load change (i.e., a difference in motor speed) of the electric device 102 when the seat 10 moves. The motor speed here may refer to any one or a combination of the motors 21 to 24 mounted on the seat 10. The obstacle OB is usually pinched when the seat 10 moves forward or backward or the seat back portion 14 falls backward. Therefore, for example, the seat control ECU shown in FIG. 1B may be used to detect the speed change of the motors 21 and 24 to determine the change in the pinch load on the obstacle OB.

The obstacle detection unit 106 detects whether the obstacle OB exists in the moving direction of the seat 10. That is, as shown in FIG. 2, the detection devices 52 and 54 such as cameras or radars in the vehicle V may detect whether the obstacle OB exists in the detection area 60.

The control unit 108 may be implemented by the controller 30 of the seat control ECU or may be implemented by the core ECU of the vehicle. Here, the control unit 108 may generate a control signal for controlling the electric device 102 based on the detection results from the pinch detection unit 104 and the obstacle detection unit 106, so as to cause the seat 10 to perform corresponding actions.

When the obstacle OB exists, that is, when the obstacle exists between the front seat 10 and the rear seat 18, the pinch load on the obstacle OB by the seat 10 is reduced. As an embodiment, this operation may be controlled by the controller 30 as the seat control ECU. For example, when the obstacle detection unit 106 detects that the obstacle OB exists, the detection result is transmitted to the controller 30, whereby the controller 30 may control the motors 21 and 24 to reduce the pinch load on the obstacle OB. How to reduce the pinch load on the obstacle OB is further described below.

Figure 5:
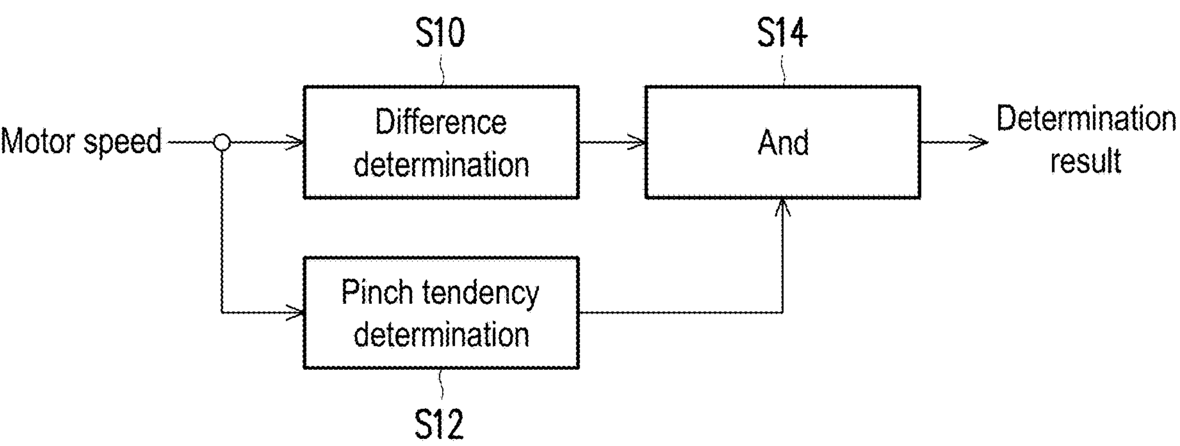
FIG. 5 is a schematic diagram showing a logical concept for determining a pinch according to an embodiment of the disclosure.

FIG. 5 is a schematic diagram showing a logical concept for determining a pinch according to an embodiment of the disclosure. As shown in FIG. 5, after receiving the motor speed (for example, through the controller 30 as the seat control ECU), the control unit 108 performs a difference value determination in step S10 and a pinch tendency determination in step S12. Finally, in step S14, the determination results of steps S10 and S12 are combined to output the determination result of the seat 10 pinching the obstacle 10. That is, when the seat 10 pinches the obstacle OB or the occupant of the rear seat 18, the rotation speed of the motor (such as the motors 21 to 24) will decrease. Afterwards, the difference in speed reduction amount (i.e., equivalent to the differential value) may be calculated. Thereafter, it is determined whether the difference exceeds a predetermined determination threshold, and when the difference value shows a tendency for pinch, it is determined that a pinch has occurred.

Regarding step S10, when performing the difference determination, that is, performing the motor speed difference determination, a difference A in motor speed is calculated at a certain count (such as a certain interval). When the difference A exceeds a predetermined determination threshold, it is determined that a pinch has occurred.

Figures 6A, 6B, 7A, 7B:
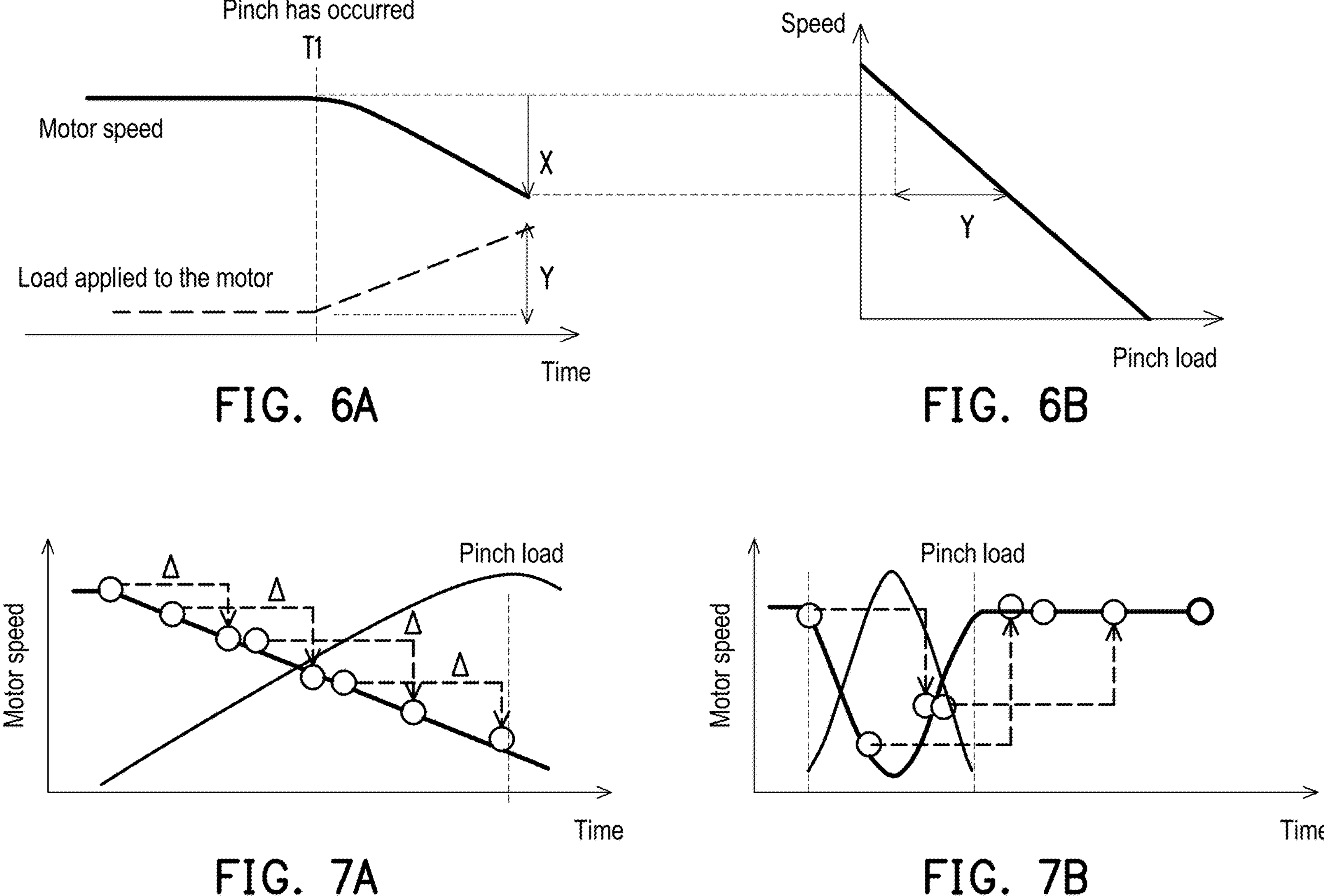
FIG. 6A and FIG. 6B are schematic diagrams showing a relationship between a motor speed and a motor load when a pinch occurs.
FIG. 7A and FIG. 7B show changes in motor speed in the absence and presence of external force.

As shown in FIG. 6A and FIG. 6B, when the pinch occurs at time T1, the motor speed begins to decrease with the increase of time, where X is the reduction amount of the motor speed caused by the pinch. At the same time, the load (estimated value) applied to the motor also begins to increase with the increase of time, where Y is the increase in the load on the obstacle caused by the pinch. Therefore, by using the characteristic curve of the motor, the pinch load on the obstacle OB may be estimated from the amount of change in the motor speed.

In addition, if the motor speed difference determination is used alone to determine whether a pinch has occurred, the motor speed may change drastically due to local interference from external forces (such as if an occupant suddenly sits up), which in turn leads to an erroneous determination. Therefore, the disclosure further performs the pinch tendency determination through step S12. Firstly, the difference in the motor speed calculated each time is compared for a period of time, and if the difference maintains a substantially fixed value, it may be determined that a pinch has occurred.

As shown in FIG. 7A, the difference A between the motor speeds calculated per time period is substantially kept constant, and the increase in the pinch load when pinch occurs will take a relatively long time to change. As shown in FIG. 7B, the pinch load caused by the external force disturbance changes greatly in a short period of time. Therefore, the measurement data from past measurements may be used to analyze whether there is a tendency for pinch.

Figure 8:
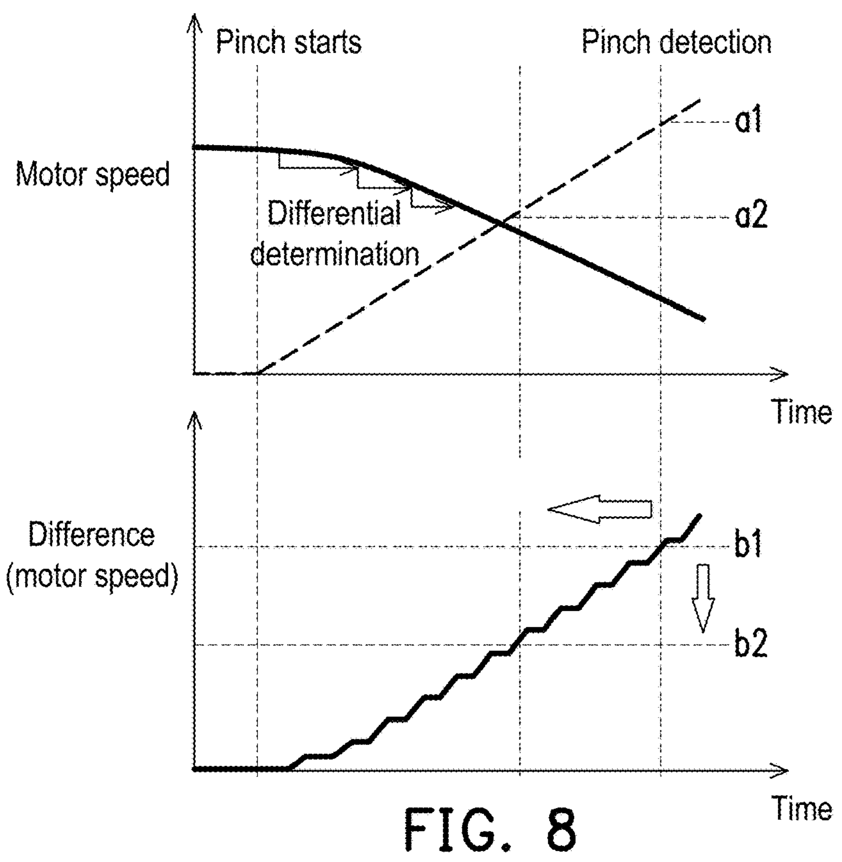
FIG. 8 is an explanatory diagram showing a method of reducing a pinch load according to an embodiment of the disclosure.

Next, a method of reducing the pinch load when the obstacle detection unit 106 detects the obstacle OB will be described. According to an embodiment of the disclosure, as shown in FIG. 8, at time point T1, for example, when the seat 10 moves backward (which may also include the case where the seat 10 moves backward and the seat back portion 14 falls backward at the same time) and just contacts the obstacle OB or the occupant of the rear seat 18, the pinch starts. After that, as time goes by, the motor speed starts to decrease. At this time, as described above, the controller 30 as the seat control ECU starts calculating the difference in motor speed. When the obstacle OB does not exist, at time point T2, when the load change (i.e., difference) of the electric device 102 exceeds a predetermined determination threshold b1, the pinch detection unit 104 determines that a pinch has occurred and detects pinch. The pinch load at this time is b1, and the object of the pinch is the occupant of the rear seat 18.

When the obstacle detection unit 106 detects that the obstacle OB exists, the controller 30 as the seat control ECU may lower the determination threshold from the determination threshold b1 to a determination threshold b2. Therefore, it can be seen that the load change (i.e., the difference) exceeds the determination threshold b2 at time point T earlier than time point T2. Therefore, according to the embodiment of the disclosure, when the obstacle OB exists, the occurrence of pinch may be detected earlier. As shown in FIG. 8, at time point T, a corresponding pinch load is a2, which is smaller than a pinch load a1.

Therefore, when the obstacle OB exists, the predetermined determination threshold (b1→b2) of the pinch detection unit 104 is lowered compared to when the obstacle OB does not exist, and the pinch load may be reduced from a1 to a2. Therefore, when the obstacle OB exists, by lowering the determination threshold, it is possible to determine the occurrence of pinch earlier, thereby reducing the pinch load on the obstacle OB (or the occupant sitting in the rear seat 18).

Figure 9:
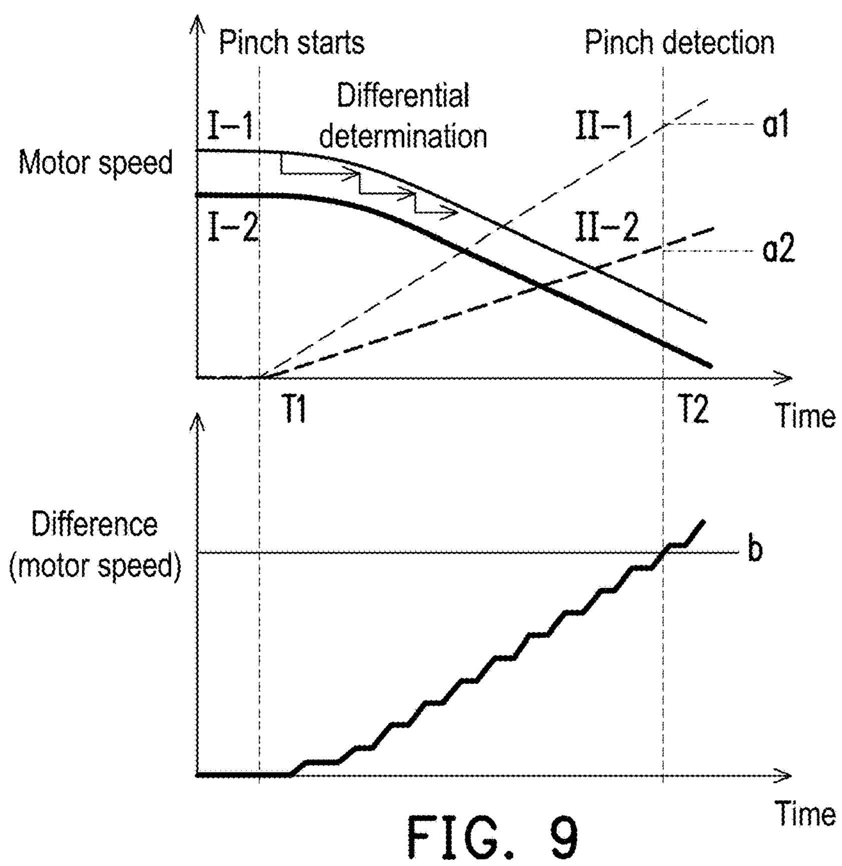
FIG. 9 is an explanatory diagram showing a method of reducing a pinch load according to another embodiment of the disclosure.

According to another embodiment of the disclosure, as shown in FIG. 9, at time point T1, for example, when the seat 10 moves backward (which may also include the case where the seat 10 moves backward and the seat back portion 14 falls backward at the same time) and just contacts the obstacle OB or the occupant of the rear seat 18, the pinch starts. After that, as time goes by, the motor speed starts to decrease. At this time, as described above, the controller 30 as the seat control ECU starts calculating the difference in motor speed. When the obstacle OB does not exist, at time point T2, when the load change (i.e., difference) of the electric device 102 exceeds a predetermined determination threshold b, the pinch detection unit 104 determines that a pinch has occurred and detects pinch. The pinch load at this time is a1, and the object of the pinch is the occupant of the rear seat 18.

When the obstacle detection unit 106 detects that the obstacle OB exists, compared with the above embodiment in which the determination threshold is lowered, the present embodiment does not lower the determination threshold but lowers the motor speed. At this time, as shown in FIG. 9, after the motor speed is reduced, its corresponding curve changes from I-1 to I-2. At this time, the pinch load curve changes from II-1 to II-2. Therefore, even if the obstacle OB exists and the determination threshold b remains unchanged, since the motor speed is reduced, its corresponding pinch load is also reduced to a2.

Therefore, when the obstacle OB exists, the pinch load may be reduced by reducing the motor speed, that is, the moving speed of the seat, compared to when the obstacle OB does not exist. Therefore, when the obstacle OB exists, by reducing the moving speed of the seat (including the moving speeds of the seat cushion portion 12 and the seat back portion 14), the pinch load on the obstacle OB (or the occupant sitting in the rear seat 18) may be reduced.

Figure 10:
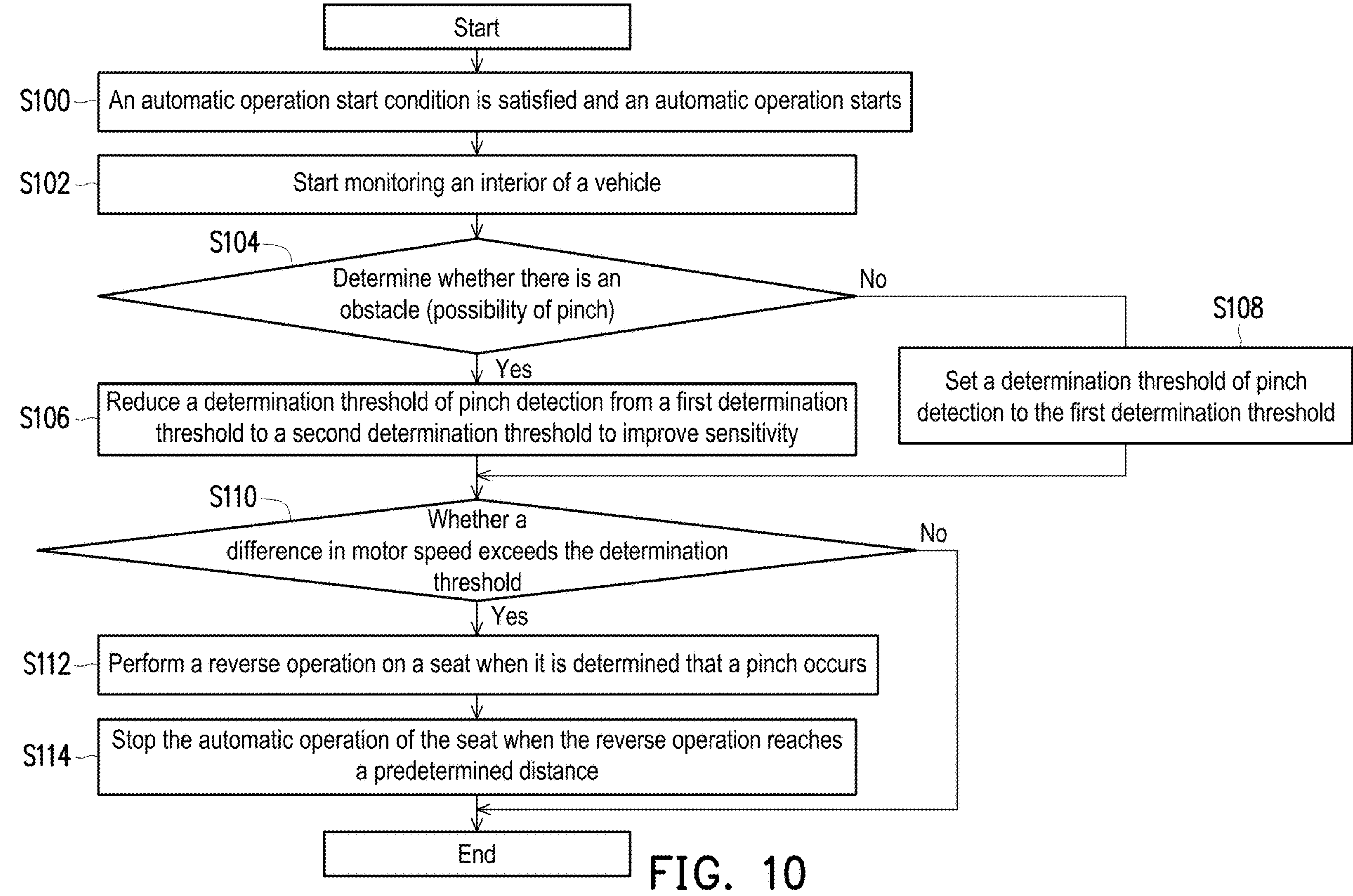
FIG. 10 is a schematic diagram showing a pinch detection flow of a vehicle seat according to an embodiment of the disclosure.

Next, the control flow of the pinch detection of the vehicle seat according to the embodiment of the disclosure is described. FIG. 10 is a schematic diagram showing a pinch detection flow of a vehicle seat according to an embodiment of the disclosure. This embodiment corresponds to the control method shown in FIG. 8.

As shown in FIG. 10, in step S100, the automatic operation start condition is satisfied and the automatic operation starts. The automatic operation here may refer to an automatic adjustment operation of the seat 10 of the vehicle V, which is an automatic movement in at least four directions of A to D as shown in FIG. 1A.

In step S102, the interior of the vehicle V is monitored using the camera or radar as the detection devices 52 and 54 in the vehicle V. A camera or a radar is an example of the obstacle detection unit 106.

In step S104, the obstacle detection unit 106 may detect within the detection area 60 in the vehicle V to determine whether there is the obstacle OB, that is, detect whether there is the obstacle OB between the front seat 10 and the rear seat 18.

When it is detected that the obstacle OB exists between the front seat 10 and the rear seat 18 (i.e., "Yes" in step S104), step S106 is executed. In step S106, the determination threshold of pinch detection is lowered from the first determination threshold b1 to the second determination threshold b2 (see FIG. 8), thereby improving sensitivity. Afterwards, the process continues to execute step S110.

On the contrary, when the obstacle OB is not detected to exist between the front seat 10 and the rear seat 18 (i.e., "No" in step S104), step S108 is executed. In step S108, the determination threshold of pinch detection is set to the first determination threshold b1 (see FIG. 8). Afterwards, the process continues to execute step S110.

In step S110, it is detected whether the difference in motor speed (and thus the estimated pinch load) exceeds a determination threshold. At this time, if the obstacle OB is not detected in step S104, whether pinch occurs is determined based on whether the difference in motor speed exceeds the first determination threshold b1. Furthermore, if the obstacle OB is detected in step S104, whether pinch occurs is determined based on whether the difference in motor speed exceeds the second determination threshold b2. This determination may be performed by, for example, the controller 30 which is the seat control ECU.

In step S110, when the difference in motor speed exceeds the determination threshold (b1 or b2) (i.e., "Yes"), that is, when it is determined that a pinch occurs, step S112 is executed, that is, the controller 30 performs a reverse operation on the seat 10. Here, the reverse operation refers to moving the seat 10 in the direction opposite to the certain direction when the seat 10 is moved in a certain direction and a pinch has occurred. For example, when the seat 10 is moved backward as a whole, the reverse operation will cause the seat 10 to move forward. Also, if the seat 10 is such that the seat back portion 14 is moved backward (rotated), the reverse operation will cause the seat back portion 14 of the seat 10 to move forward (rotate). Of course, the movement of the seat 10 may also include these two movements, or include movement in at least the four directions shown in FIG. 1A.

Next, in step S114, when the reverse operation is performed on the seat 10 and reaches a predetermined distance, the automatic adjustment operation of the seat 10 is stopped, and the control flow ends. For example, for the forward and backward movement of the seat 10, the predetermined distance is a linear distance, whereas for the forward and backward movement (rotation) of the seat back portion 14 of the seat 10, the predetermined distance is a rotation angle (or an arc distance of movement). In addition, this predetermined distance may be set in advance in the controller, or may also be set by the user.

Furthermore, in step S110, when the difference in motor speed does not exceed the determination threshold (b1 or b2) (i.e., "No"), that is, when it is determined that no pinch occurs, the control flow ends.

Figure 11:
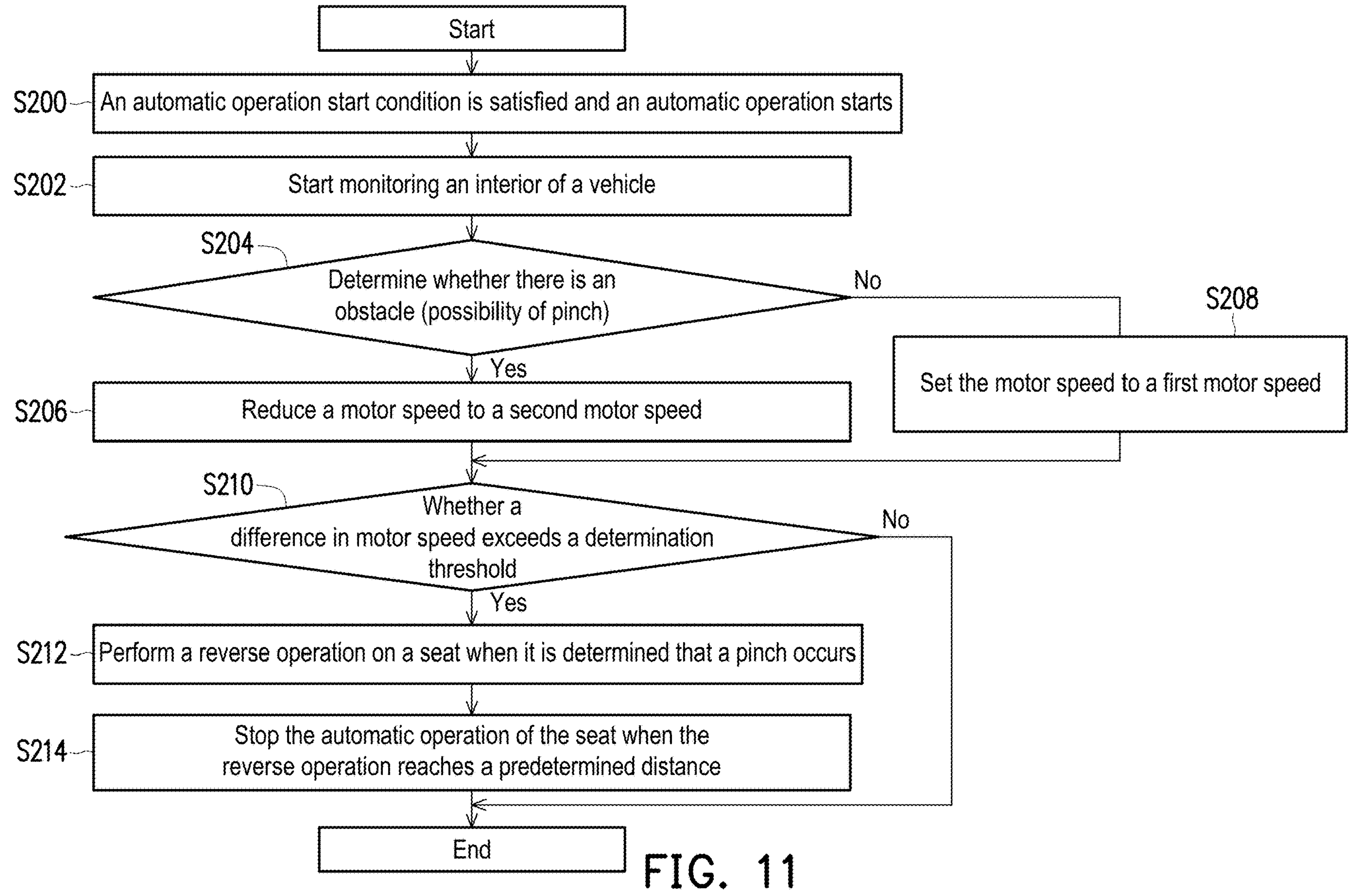
FIG. 11 is a schematic diagram showing a pinch detection flow of a vehicle seat according to another embodiment of the disclosure.

FIG. 11 is a schematic diagram showing a pinch detection flow of a vehicle seat according to another embodiment of the disclosure. This embodiment corresponds to the control method shown in FIG. 9. As shown in FIG. 11, in step S200, the automatic operation start condition is satisfied and the automatic operation starts. The automatic operation here may refer to an automatic adjustment operation of the seat 10 of the vehicle V, which is an automatic movement in at least four directions of A to D as shown in FIG. 1A.

In step S202, the interior of the vehicle V is monitored using the camera or radar as the detection devices 52 and 54 in the vehicle V. A camera or a radar is an example of the obstacle detection unit 106.

In step S204, the obstacle detection unit 106 may detect within the detection area 60 in the vehicle V to determine whether there is the obstacle OB, that is, detect whether there is the obstacle OB between the front seat 10 and the rear seat 18.

When it is detected that the obstacle OB exists between the front seat 10 and the rear seat 18 (i.e., "Yes" in step S204), step S206 is executed. In step S206, the motor speed is reduced to a second motor speed (refer to FIG. 9). Afterwards, the process continues to execute step S210.

On the contrary, when the obstacle OB is not detected to exist between the front seat 10 and the rear seat 18 (i.e., "No" in step S204), step S208 is executed. In step S208, the motor speed is set at a first motor speed greater than the second motor speed (refer to FIG. 9). Afterwards, the process continues to execute step S210.

In step S210, it is detected whether the difference in motor speed (and thus the estimated pinch load) exceeds the determination threshold b (see FIG. 9). At this time, if the obstacle OB is not detected in step S204, whether pinch occurs is determined based on whether the difference in the first motor speed exceeds the determination threshold b. Furthermore, if the obstacle OB is detected in step S204, whether pinch occurs is determined based on whether the difference in the second motor speed exceeds the determination threshold b. This determination may be performed by, for example, the controller 30 which is the seat control ECU.

In step S210, when the difference in motor speed (first or second motor speed) exceeds the determination threshold b (i.e., "Yes"), that is, when it is determined that a pinch occurs, step S212 is executed, that is, the controller 30 performs a reverse operation on the seat 10. Here, the reverse operation refers to moving the seat 10 in the direction opposite to the certain direction when the seat 10 is moved in a certain direction and a pinch has occurred. For example, when the seat 10 is moved backward as a whole, the reverse operation will cause the seat 10 to move forward. Also, if the seat 10 is such that the seat back portion 14 is moved backward (rotated), the reverse operation will cause the seat back portion 14 of the seat 10 to move forward (rotate). Of course, the movement of the seat 10 may also include these two movements, or include movement in at least the four directions shown in FIG. 1A.

Next, in step S214, when the reverse operation is performed on the seat 10 and reaches a predetermined distance, the automatic adjustment operation of the seat 10 is stopped and the control flow ends. For example, for the forward and backward movement of the seat 10, the predetermined distance is a linear distance, whereas for the forward and backward movement (rotation) of the seat back portion 14 of the seat 10, the predetermined distance is a rotation angle (or an arc distance of movement). In addition, this predetermined distance may be set in advance in the controller, or may also be set by the user.

Furthermore, in step S210, when the difference in the motor speed (the first or second motor speed) does not exceed the determination threshold b (i.e., "No"), that is, when it is determined that no pinch occurs, the control flow ends.

According to the embodiment of the disclosure, only when the camera or radar disposed in the vehicle detects the possibility of pinch, the determination threshold of pinch detection is changed to improve the sensitivity and reduce the pinch load. Also, by reducing the motor speed and lowering the pinch load without changing the determination threshold of pinch detection, false detection during normal operation may be prevented, and the pinch load may also be lowered only when a pinch condition occurs.

Finally, it should be noted that the foregoing embodiments are only used to illustrate the technical solutions of the disclosure, but not to limit the disclosure; although the disclosure has been described in detail with reference to the foregoing embodiments, persons of ordinary skill in the art should understand that the technical solutions described in the foregoing embodiments can still be modified, or parts or all of the technical features thereof can be equivalently replaced; however, these modifications or substitutions do not deviate the essence of the corresponding technical solutions from the scope of the technical solutions of the embodiments of the disclosure.

What is claimed is:

1. A seat device for a vehicle, comprising:
- an electric device, configured to move a seat of the vehicle;
- a pinch detection unit, detecting a pinched obstacle by detecting a load change of the electric device when the seat moves, wherein the pinch detection unit includes an electronic control unit;
- an obstacle detection unit, detecting whether the obstacle exists in a moving direction of the seat, wherein the obstacle detection unit includes a camera or a radar; and
- a control unit, reducing a pinch load on the obstacle caused by the seat when the obstacle exists.

2. The seat device for the vehicle according to claim 1, wherein
- the pinch detection unit is configured to determine that the obstacle is pinched when the load change of the electric device exceeds a predetermined determination threshold, and
- the control unit reduces the predetermined determination threshold of the pinch detection unit when the obstacle exists compared to when the obstacle does not exist.

3. The seat device for the vehicle according to claim 1, wherein
- when the obstacle detection unit detects that the obstacle exists, the control unit reduces a moving speed of the seat compared to when the obstacle does not exist.

4. The seat device for the vehicle according to claim 1, wherein
- the seat of the vehicle further comprises a seat cushion portion and a seat back portion.

5. The seat device for the vehicle according to claim 2, wherein
- the seat of the vehicle further comprises a seat cushion portion and a seat back portion.

6. The seat device for the vehicle according to claim 3, wherein
- the seat of the vehicle further comprises a seat cushion portion and a seat back portion.

7. A control method for a seat device for a vehicle, wherein the seat device has an electric device configured to move a seat of the vehicle, and the control method for the seat device for the vehicle comprises:
- detecting, by a pinch detection unit, a pinched obstacle by detecting a load change of the electric device when the seat moves;
- detecting, by an obstacle detection unit, whether the obstacle exists in a moving direction of the seat; and
- reducing a pinch load on the obstacle caused by the seat when the obstacle exists.

8. The control method for the seat device for the vehicle according to claim 7, further comprising:
- determining that the obstacle is pinched when the load change of the electric device exceeds a predetermined determination threshold,
- wherein the predetermined determination threshold of a pinch detection unit is reduced when the obstacle exists compared to when the obstacle does not exist.

9. The control method for the seat device for the vehicle according to claim 7, wherein
- when it is detected that the obstacle exists, a moving speed of the seat is reduced compared to when the obstacle does not exist.

10. The control method for the seat device for the vehicle according to claim 7, wherein
- the seat of the vehicle further comprises a seat cushion portion and a seat back portion.

11. The control method for the seat device for the vehicle according to claim 8, wherein
- the seat of the vehicle further comprises a seat cushion portion and a seat back portion.

12. The control method for the seat device for the vehicle according to claim 9, wherein
- the seat of the vehicle further comprises a seat cushion portion and a seat back portion.

* * * * *